(12) United States Patent
Chiu et al.

(10) Patent No.: US 8,305,734 B2
(45) Date of Patent: Nov. 6, 2012

(54) INSULATING ENCAPSULATION STRUCTURE FOR SOLID CHIP ELECTROLYTIC CAPACITOR

(75) Inventors: Chi-Hao Chiu, Hsinchu (TW); Ming-Tsung Chen, Changhua County (TW); Chiao-Yinms Yang, Miaoli County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 240 days.

(21) Appl. No.: 12/907,158

(22) Filed: Oct. 19, 2010

(65) Prior Publication Data

US 2012/0092810 A1   Apr. 19, 2012

(51) Int. Cl.
*H01G 9/08* (2006.01)

(52) U.S. Cl. ........ 361/535; 361/525; 361/523; 361/528; 361/529; 361/536

(58) Field of Classification Search .................. 361/523, 361/525–528, 529–530, 535–536, 540–541, 361/516–519; 29/25.01, 25.03
See application file for complete search history.

(56) References Cited

U.S. PATENT DOCUMENTS

| | | | | |
|---|---|---|---|---|
| 5,699,597 | A * | 12/1997 | Nakamura et al. | 29/25.03 |
| 6,243,256 | B1 * | 6/2001 | Furuta et al. | 361/528 |
| 6,288,890 | B1 * | 9/2001 | Saito et al. | 361/523 |
| 6,392,869 | B2 * | 5/2002 | Shiraishi et al. | 361/523 |
| 6,594,141 | B2 * | 7/2003 | Takada | 361/523 |
| 6,790,384 | B2 * | 9/2004 | Konuma et al. | 252/500 |
| 7,046,504 | B2 * | 5/2006 | Sakai et al. | 361/523 |

* cited by examiner

*Primary Examiner* — Nguyen T Ha
(74) *Attorney, Agent, or Firm* — Rosenberg, Klein & Lee

(57) ABSTRACT

An insulating encapsulation structure is applied to a chip type solid electrolytic capacitor that includes an aluminum metallic body having an aluminum core layer. An upper oxide film and a lower oxide film respectively having fine holes on their surfaces are respectively formed on the top and the bottom of the aluminum core layer. On side surfaces of the metallic body is a plurality of cut burrs. The upper oxide film and the lower oxide film of the metallic body are respectively separated by a separating layer to form an anode and a cathode. The insulating encapsulation structure includes an insulating cover layer enclosing an outer surface of the metallic body to cover the cut burrs. Thereby, the required chemical conversion process is reduced along with current leakage, the overall manufacturing cost is lowered, and the mechanical strength for the edge of the metallic body is reinforced.

8 Claims, 6 Drawing Sheets

INSULATING ENCAPSULATION STRUCTURE FOR SOLID CHIP ELECTROLYTIC CAPACITOR

BACKGROUND OF THE INVENTION

1. Field of the Invention

The instant disclosure relates to an insulting encapsulation structure, and more particularly to an insulating encapsulation structure for a chip type solid electrolytic capacitor.

2. Description of Related Art

With the development of mini electronics and high-density printed circuit boards with high efficiency, the development of a chip type solid electrolytic capacitor has been increasing rapidly. A commercially available solid electrolytic capacitor mainly employs metals such as aluminum, tantalum, niobium, or titanium. Among those, aluminum and tantalum are the most widely used in the production of solid electrolytic capacitors.

In the manufacturing of aluminum solid electrolytic capacitors, an aluminum foil is subject to an electrolytic etching process to form a thin metal core structure 1, as shown in FIG. 1. The Oxide layers 11 and 12, which possess on the surface thereof, are then respectively formed on the top and bottom surfaces of the center conducting layer 1. Next, the sandwich structure is cut into aluminum body 13 of predetermined shapes by a cutting or a punching method, as shown in FIG. 2. When the aluminum body (the sandwich structure) 13 is undergone the cut/punching process, part of the aluminum core layer 14 is exposed from the edges. A highly conductive polymeric layer is then disposed on the sandwich structure 13. Conventionally, to prevent the electrically conductive polymeric layer from contacting the exposed aluminum core layer 14 and causing short circuit, a second oxidation process is taken place to provide additional oxide layers over the aluminum core layer 14 before a carbon or silver glue can be subsequently applied over the aluminum body 13.

However, the cutting/punching process often causes the edges of the metallic body 13 to crack and deform, thus leaving imperfect burrs around the edges. The burrs on the aluminum body 13 may hinder the proper adherence of the oxide layer onto the aluminum body 13. As a result, increased current leakage problems may occur in the formation of the capacitor.

Therefore, there is a need of an insulating encapsulation structure for a solid chip electrolytic capacitor which overcomes the above disadvantages.

SUMMARY OF THE INVENTION

One particular aspect of the instant disclosure is to provide an insulating encapsulation structure for a solid chip electrolytic capacitor, in which an insulating layer is used to cover the exposed aluminum core at the edges of an aluminum metallic body, after the metallic body undergone cutting/puncturing procedures. The application of the insulating encapsulation layer effectively replaces the conventional second oxidation treatment of the aluminum body, thereby, reducing the number of forming process.

Moreover, lateral sides of the solid chip electrolytic capacitor can be covered by the insulating encapsulation structure, so that the insulating encapsulation structure can avoid leakage current leaking from the lateral sides of the solid chip electrolytic capacitor due to cut burrs. Therefore, the instant disclosure may reduce electric leakage of the solid chip electrolytic capacitor and increase the work efficiency of the solid chip electrolytic capacitor.

Another particular aspect of the instant disclosure is to provide an insulating encapsulation structure for a chip type solid electrolytic capacitor, in which an insulating cover layer encloses the edges of an aluminum metallic body for enhancing the strength at the edges of the metallic body. Thus, short circuit problems as a result of the surface damages at the edge during packaging process may be prevented.

In order to achieve the aforementioned objects, according to an embodiment of the instant disclosure, an insulating encapsulation structure for a chip type solid electrolytic capacitor is provided. The chip type solid electrolytic capacitor includes an aluminum metallic body having a conductive aluminum core layer. An oxide layer having fine holes on the surfaces is respectively formed on the top and the bottom surfaces of the aluminum core layer. The side edge surfaces of the metallic body may have a plurality of cut burrs as a result from the cutting processes. A separating layer 41 is formed on the aluminum metallic body, dividing the aluminum body into an anode region and a cathode region. An insulating encapsulation layer is further disposed on the side edge of the cathode region of the aluminum body, covering the burrs resulting from the cutting/puncturing process.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
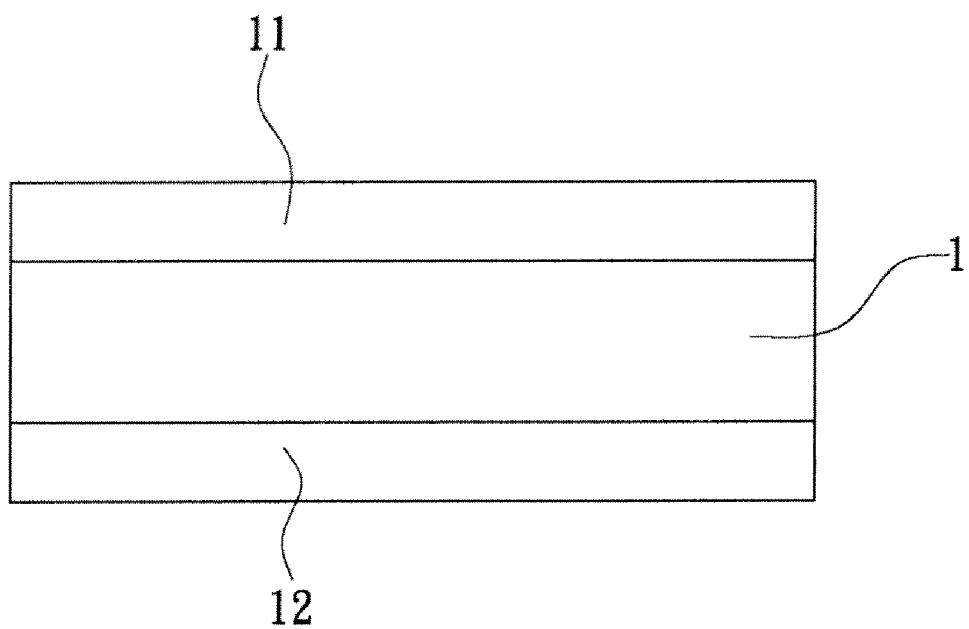
FIG. 1 shows a cross-sectional view of a conventional solid electrolytic capacitor having oxide films with fine holes respectively on the top and the bottom of an aluminum foil.
Figure 2:
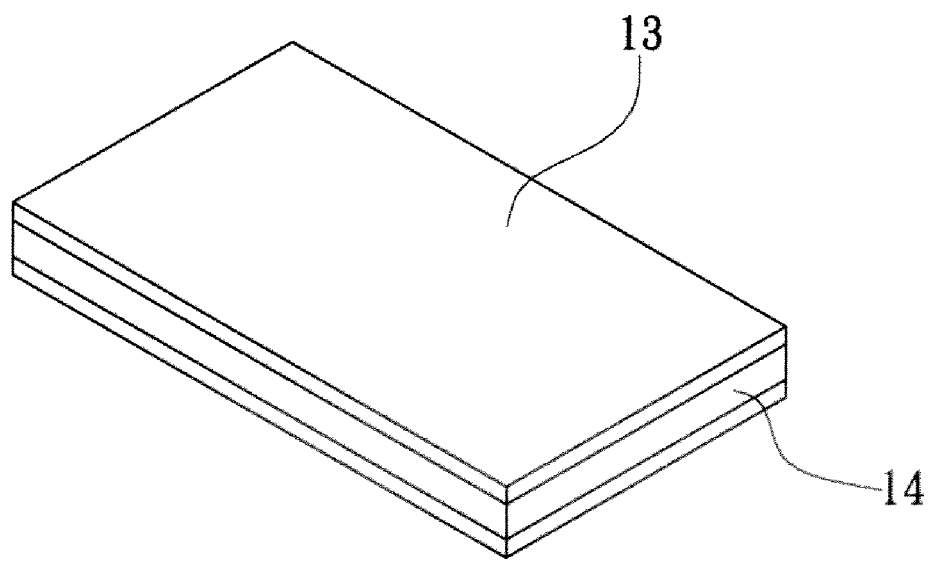
FIG. 2 shows a plan view of edges of a conventional solid electrolytic capacitor after cutting or punching.
Figure 3:
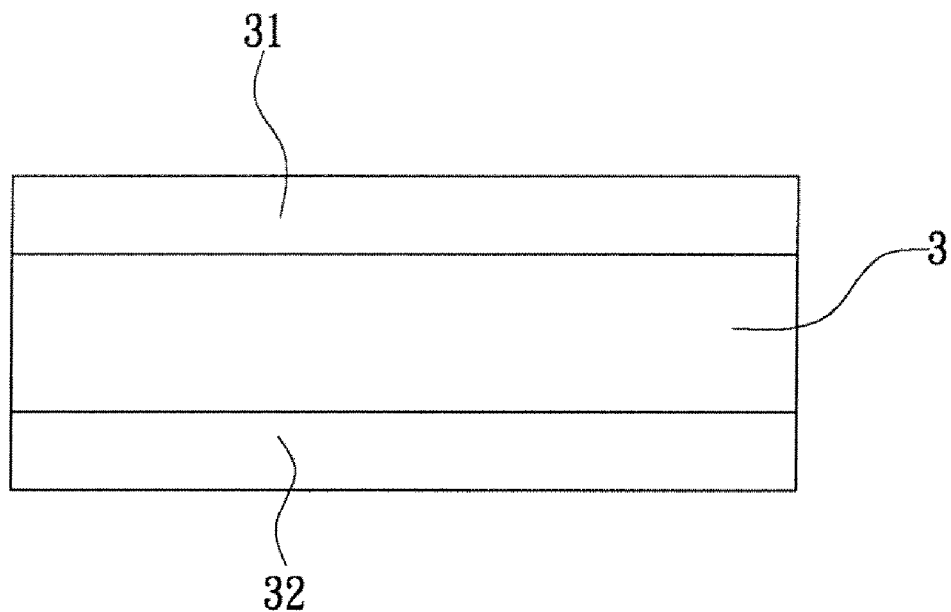
FIG. 3 is a cross-sectional view of an aluminum foil having oxide films with fine holes on the top and the bottom thereof according to one embodiment of the invention.

Referring to FIG. 3, an aluminum foil is subjected to an electrolytic etching process to form an aluminum body 3 having tiny holes on the etched surface. Subsequently, the top and the bottom surface of the aluminum body 3 are subjected to an oxidation process to form oxide layers 31 and 32 respectively over the etched surfaces of the aluminum foil. The uneven etched surfaces on the aluminum foil provide enhanced adherence capability for the oxidation layers. The aluminum body 3 can be processed by cutting or punching to obtain an aluminum body 4 of predetermined size, as shown in FIG. 4.

Figure 4:
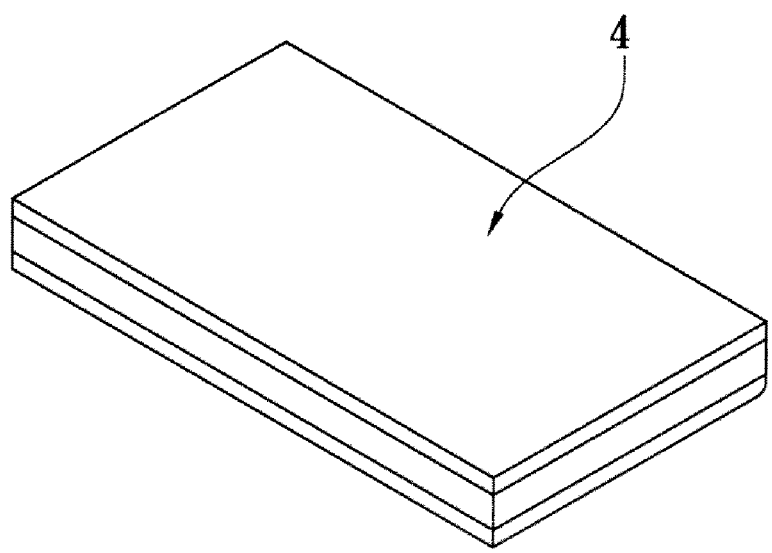
FIG. 4 is a perspective view of an aluminum metallic body after cutting or punching according to one embodiment of the invention.
Figure 5:
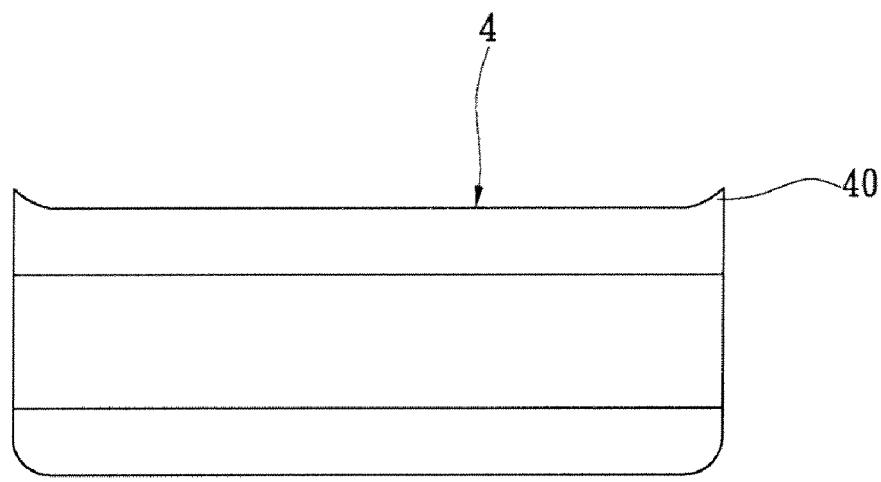
FIG. 5 is a cross-sectional view of FIG. 4.

FIG. 5 is a cross-sectional view of FIG. 4. After undergone the cutting/puncturing process, the metallic body 4 may develop cracks, burrs or deformations at the side edges, as indicated by the cut burrs 40 pitching upward in FIG. 5.

Figure 6A:
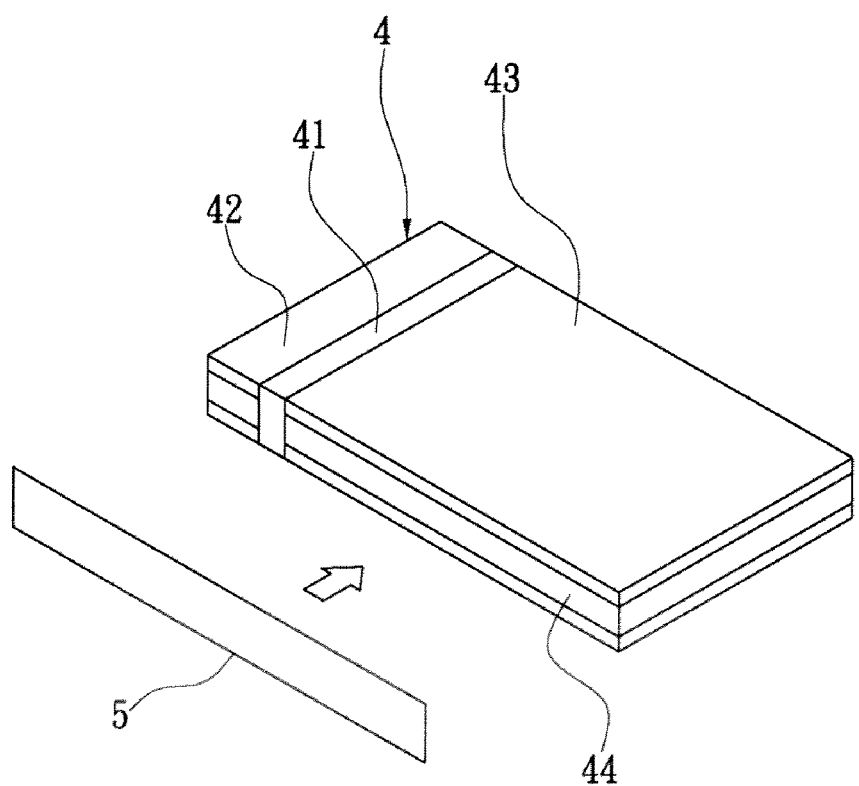
FIG. 6A is an exploded view of an aluminum metallic body having a layer to cover the edges thereof according to one embodiment of the invention.
Figure 6B:
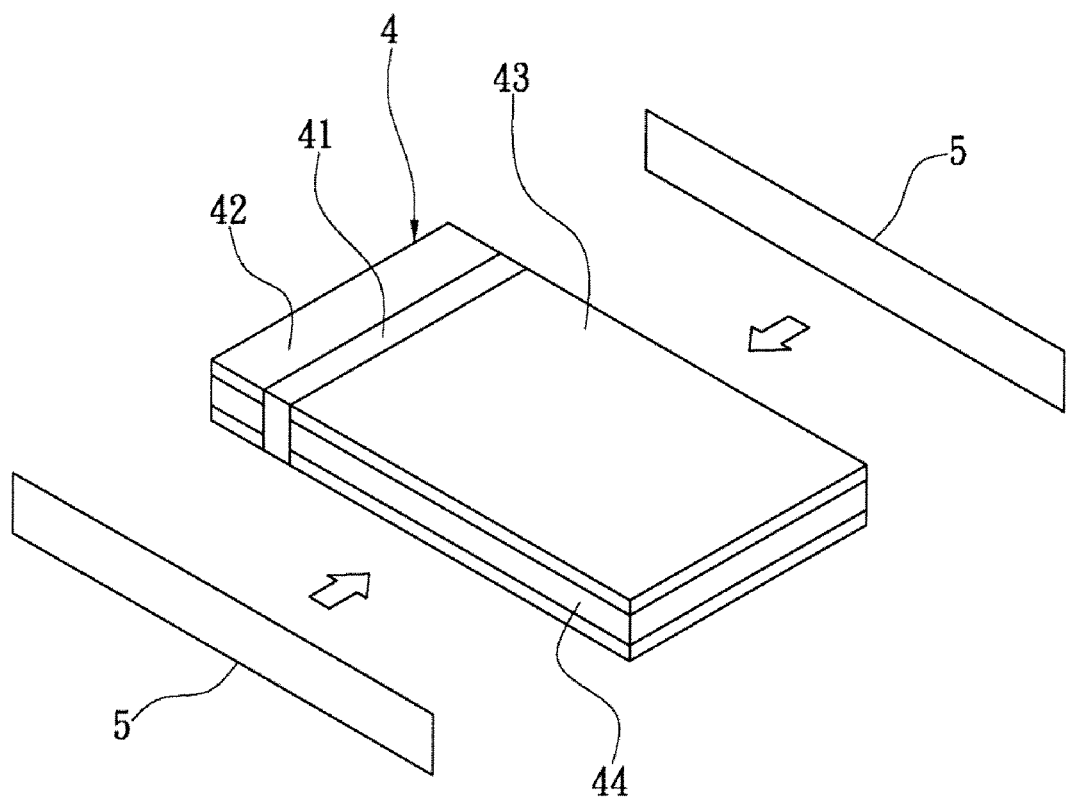
FIG. 6B is an exploded view of an aluminum metallic body having two layers in covering the edges thereof according to one embodiment of the invention.
Figure 6C:
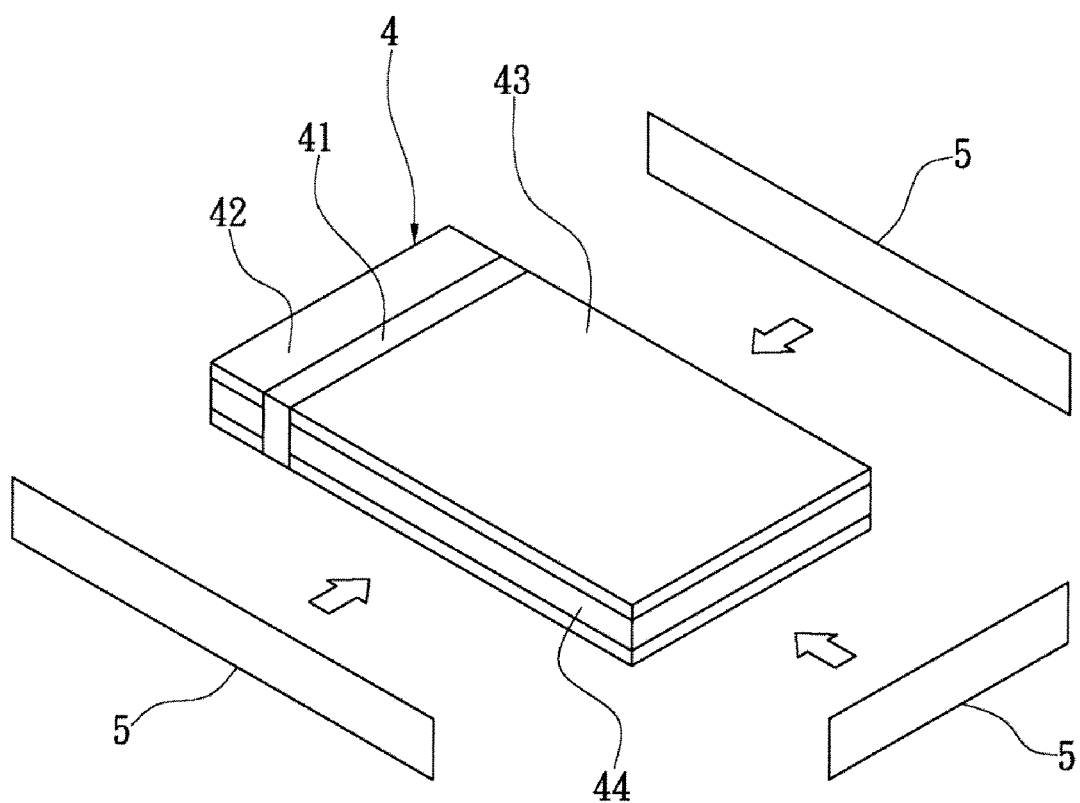
FIG. 6C is an exploded view of an aluminum metallic body having three layers in covering the edges thereof according to one embodiment of the invention.

Referring to FIG. 6A through FIG. 6C, a separating layer 41 is disposed on the aluminum body 3 to form an anode region 42 and a cathode region 43. An insulating layer is then formed on the outer edge of the cathode region 43, covering the burrs and other imperfection resulting from the packing processes. The insulating layer may comprise insulating materials such as polyimide, epoxy resin, or silicone; and the application technique for the insulating layers may include printing, coating or spraying etc. Thus, the insulating cover layer 5 effectively covers the exposed portions of the aluminum core layer 44. For one thing, an outer surface of the metallic body 4 has at least one to three side surfaces at the cathode region 43, respectively shown in FIG. 6A through FIG. 6C. The insulating cover layer 5 may cover the whole or part of the side surface, i.e. covers at least the cut burrs 40.

For example, the outer surface of the metallic body 4 has at least one side surface at the cathode region 43. Therefore, the insulating cover layer 5 encloses the whole area of at least one side surface. Alternatively, the insulating layer 5 encloses at least the cut burrs 40 on the upper half of at least one side surface.

Next, an electrically conductive polymeric layer, carbon glue, and silver conductive glue are in turns formed on the cathode region 43 of the metallic body 4. Thereby, any short circuit or increase in current leakage can be avoided in the process of forming the electrically conductive polymeric layer. Furthermore, the number of oxide forming process can be reduced, and the production cost can be lowered.

Figure 7:
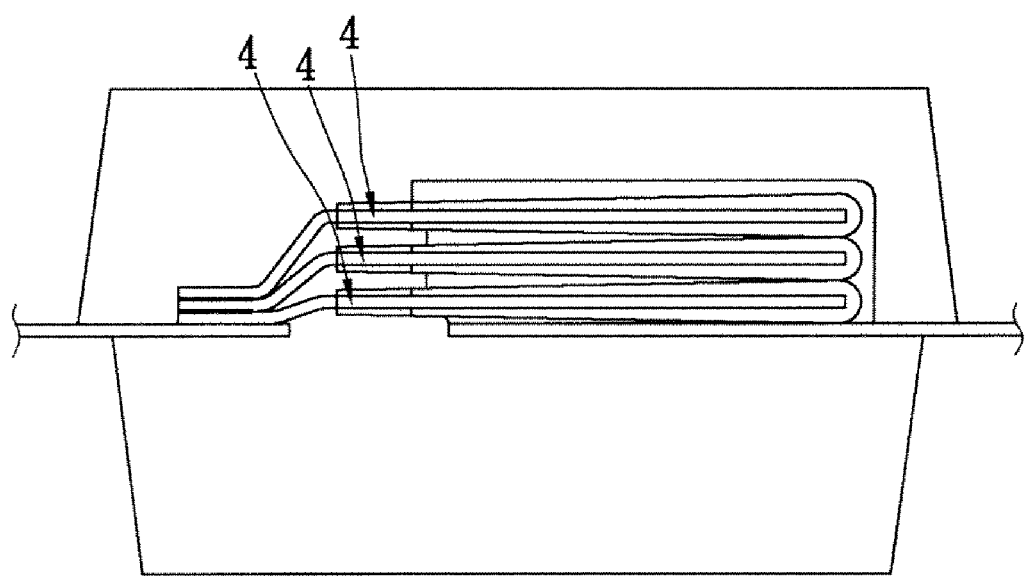
FIG. 7 is a schematic view of a laminated chip type solid electrolytic capacitor using a plurality of aluminum metallic bodies according to another embodiment of the invention.

Referring to FIG. 7, the instant disclosure of the insulating cover layer can also be applied to a laminated chip type solid electrolytic capacitor having a plurality of metallic bodies 4, which can prevent the laminated cathode regions from being deformed during packaging while maintaining the characteristics of the laminated chip type solid electrolytic capacitor.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An insulating encapsulation structure for a chip type solid electrolytic capacitor, the chip type solid electrolytic capacitor comprising an aluminum metallic body having an aluminum core layer, wherein an upper oxide film and a lower oxide film respectively having fine holes on their surfaces are respectively formed on the top and the bottom of the aluminum core layer; on side surfaces of the metallic body is a plurality of cut burrs; the upper oxide film and the lower oxide film of the metallic body are respectively separated by a separating layer to form an anode and a cathode; and the insulating encapsulation structure comprises an insulating cover layer enclosing the outer surface of the metallic body to cover the cut burrs.

2. The insulating encapsulation structure for a chip type solid electrolytic capacitor of claim 1, wherein the insulating cover layer is made of polyimide, epoxy resin, or silicon.

3. The insulating encapsulation structure for a chip type solid electrolytic capacitor of claim 1, wherein the outer surface of the metallic body has at least one side surface at the cathode region, and the insulating cover layer covers the whole area of the at least one side surface.

4. The insulating encapsulation structure for a chip type solid electrolytic capacitor of claim 1, wherein the outer surface of the metallic body has at least one side surface at the cathode region, and the insulating cover layer covers the cut burrs on the upper half of the at least one side surface.

5. An insulating encapsulation structure for a chip type solid electrolytic capacitor, wherein the chip type solid electrolytic capacitor has a plurality of aluminum metallic bodies; each aluminum metallic body has an aluminum core layer, wherein an upper oxide film and a lower oxide film respectively having fine holes on their surfaces are respectively formed on the top and the bottom of each aluminum core layer; on side surfaces of the metallic body is a plurality of cut burrs; the upper oxide film and the lower oxide film of each metallic body are respectively separated by a separating layer to form an anode and a cathode; and the insulating encapsulation structure comprises a plurality of insulating cover layers enclosing outer surfaces of the metallic bodies to cover the cut burrs.

6. The insulating encapsulation for a chip type solid electrolytic capacitor of claim 5, wherein the insulating cover layer is made of polyimide, epoxy resin, or silicon.

7. The insulating encapsulation for a chip type solid electrolytic capacitor of claim 5, wherein the outer surface of each metallic body has at least one side surface at the corresponding cathode region, and each insulating cover layer covers the whole area of the at least one side surface of each metallic body.

8. The insulating encapsulating structure for a chip type solid electrolytic capacitor of claim 5, wherein the outer surface of each metallic body has at least one side surface at the corresponding cathode region, and each insulating cover layer covers the cut burrs on the upper half of the at least one side surface of each metallic body.

* * * * *